(12) United States Patent
Nakai et al.

(10) Patent No.: US 7,767,342 B2
(45) Date of Patent: Aug. 3, 2010

(54) POSITIVE ELECTRODE ACTIVE MATERIAL INCLUDING A LITHIUM TRANSITION METAL COMPLEX OXIDE AND AN OXIDE OF A DISSIMILAR ELEMENT

(75) Inventors: Kenji Nakai, Fukaya (JP); Katsutoshi Kurihara, Naka-gun (JP); Yoshimasa Koishikawa, Hitachinaka (JP); Kenji Hara, Iga (JP); Syouji Hirahata, Iga (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 1357 days.

(21) Appl. No.: 11/213,876

(22) Filed: Aug. 30, 2005

(65) Prior Publication Data

US 2006/0046143 A1    Mar. 2, 2006

(30) Foreign Application Priority Data

Aug. 30, 2004    (JP)    ............................. 2004-250031

(51) Int. Cl.
*H01M 4/58*    (2010.01)
*H01M 4/00*    (2006.01)
*H01M 4/56*    (2006.01)

(52) U.S. Cl. .................... 429/231.1; 429/232; 429/223; 429/225; 429/231.3; 429/231.5; 429/218.1; 264/618

(58) Field of Classification Search .................. 429/101, 429/218.1
See application file for complete search history.

(56) References Cited

FOREIGN PATENT DOCUMENTS

| JP | 09-283180 | * 10/1997 |
|----|-----------|-----------|
| JP | 10-112306 | 4/1998 |
| JP | 2002-175808 | 6/2002 |

OTHER PUBLICATIONS

Human Translation of JP 09-283180, Inoue et al., Oct. 31, 1997.*
Machine translation of JP 10-112306, Atsumi Yoshinori, Oct. 7, 1996.*

* cited by examiner

*Primary Examiner*—Dah-Wei D Yuan
*Assistant Examiner*—Kwang Han
(74) *Attorney, Agent, or Firm*—Roberts Mlotkowski Safran & Cole, P.C.; Thomas W. Cole (57) ABSTRACT

A non-aqueous electrolyte secondary battery that can restrict lowering of battery performance during battery preservation is provided. A negative electrode that a negative electrode mixture including graphite is applied on a rolled copper foil and a positive electrode that a positive electrode mixture including lithium manganate is applied on an aluminum foil are used. An oxide in which one element selected from Al, Si, Ti, V, Cr, Fe, Ni, Cu, Zn, Zr, Mo, W, Pb and dissimilar to elements constituting the lithium manganate is oxidized is intermixed with the lithium manganate. An intermixture amount of the oxide is set such that a molar number of the dissimilar element contained in one gram of the positive electrode active material to a molar number of lithium contained in one gram of the positive electrode active material is not more than 5/1000. Charge transfer is restricted by the oxide during battery preservation.

6 Claims, 1 Drawing Sheet

Fig. 1

POSITIVE ELECTRODE ACTIVE MATERIAL INCLUDING A LITHIUM TRANSITION METAL COMPLEX OXIDE AND AN OXIDE OF A DISSIMILAR ELEMENT

FIELD OF THE INVENTION

The present invention relates to a positive electrode active material, a non-aqueous electrolyte secondary battery and a method for manufacturing a positive electrode active material, and in particular relates to a positive electrode active material, including a lithium transition metal complex oxide, used for a non-aqueous electrolyte secondary battery, a non-aqueous electrolyte secondary battery utilizing the positive electrode active material and a method for manufacturing the positive electrode active material.

DESCRIPTON OF RELATED ART

Because a non-aqueous electrolyte secondary battery represented by a lithium-ion secondary battery has high energy density as its merit, it is mainly used as a power source or power supply for portable equipment such as a VTR camera, a notebook type personal computer, a mobile telephone or the like. In the lithium-ion battery, generally, each of a positive electrode and a negative electrode of the battery is formed where an active material is applied to a metal foil (collector), and an electrode group is formed by winding or laminating the positive electrode and the negative electrode through separators so as not to abut directly with each other. This electrode group is accommodated in a battery container, and, after electrolytic solution is injected into the battery container, it is sealed.

A typical cylindrical lithium-ion secondary battery has a dimension of a diameter of 18 mm and a height of 65 mm, which is called 18650 type, and it is widely spread as a small-sized lithium-ion battery for civilian use. A lithium transition metal complex oxide is often used as a positive electrode active material for the 18650 type lithium-ion secondary battery. Among the lithium transition metal complex oxides, lithium cobaltate having high capacity and long life is mainly used as the positive electrode active material for the 18650 type lithium-ion secondary battery. The small-sized lithium-ion battery for civilian use tends to have higher capacity every year, and one having battery capacity of over 2 Ah has been developed recently.

Meanwhile, in the automotive industry, in order to cope with the environmental problems, development of electric vehicles whose power sources are confined completely to batteries so that there is no gas exhausting and development of hybrid (electric) vehicles where both internal combustion engines and batteries are used as their power sources have been accelerated, and some of them have reached a practical stage. Such a battery which is a power source for the electric vehicle is required to have not only high energy density but also high output and high capacity characteristics, and an attention is being paid to a lithium-ion battery as a battery which meets such requirements.

Further, such a battery for the electric vehicle is required to have long life characteristics to meet a long usage period of the electric vehicle. Since parking hours (battery preservation period) are overwhelmingly longer than driving hours (battery usage period) in not only the electric vehicle but a vehicle in general, it has a large significance to repress or control lowering of battery performance at the time of battery preservation in order to maintain vehicle performance for a long period.

Normally, battery performance or characteristics such as voltage, capacity and the like is lowered during the battery preservation due to self discharge and ascending of internal resistance. Minute short-circuits between positive and negative electrodes due to dissolution and deposition of foreign metals mixed into a battery, oxidization of a positive electrode active material due to chemical reaction between a positive electrode active material and non-aqueous electrolytic solution and the like can be listed for causes thereof. In order to repress lowering of battery performance due to foreign metals, JPA 10-112306 discloses a technique for limiting an amount of foreign metals in a lithium transition metal complex oxide.

Further, as a technique for enhancing battery preservation performance, JPA 2002-175808 discloses a lithium transition metal complex oxide for a positive electrode active material which can restrict ascending of internal resistance even if a battery in a charged state is preserved for a long time, by, for example, making a ratio of lithium at a surface portion of particles of the lithium transition metal complex oxide larger than that at an interior portion of the particles.

However, in the technique of JPA 10-112306, although the amount of the foreign metals in the lithium transition metal complex oxide can be restricted, a decrease in foreign metals is limited because other foreign metals mix into a battery from a conductive material, a binder, a cut chip of a collector and the like, other than the lithium transition metal complex oxide. Even if the amount of the foreign metals can be restricted, self discharge causes lowering of battery performance, the longer the battery preservation period becomes. Further, in the technique of JPA 2002-175808, although ascending of internal resistance can be restricted because the ratio of lithium at the surface portion of the lithium transition metal complex oxide particle is larger than that at the interior of the particle, self-discharge at the time of battery preservation can not be restricted.

SUMMARY OF THE INVENTION

In view of the above circumstances, an object of the present invention is to provide a positive electrode active material which can restrict lowering of battery performance during battery preservation, a non-aqueous secondary battery using the positive electrode active material and a method for manufacturing the positive electrode active material.

In order to achieve the above object, a first aspect of the present invention is directed to a positive electrode active material, including a lithium transition metal complex oxide, used for a non-aqueous electrolyte secondary battery, wherein an oxide of at least one dissimilar element, selected from elements of aluminum, silicon, titanium, vanadium, chromium, iron, nickel, copper, zinc, zirconium, molybdenum, tungsten and lead, and dissimilar to elements constituting the lithium transition metal complex oxide, is intermixed with the lithium transition metal complex oxide, and wherein an intermixture amount of the oxide is set such that a sum of a molar number of the at least one dissimilar element contained in one gram of the positive electrode active material to a molar number of lithium contained in one gram of the positive electrode active material is not more than five thousandths.

In the positive electrode active material according to the first aspect, since the oxide of the at least one dissimilar element among the dissimilar elements is intermixed with the lithium transition metal complex oxide and which has a characteristic of electric insulation or of electric resistance higher than that of a conductive material for a non-aqueous electrolyte secondary battery is used for the non-aqueous electrolyte secondary battery, charge transfer is limited by the oxide during battery preservation, and accordingly, self-discharge of the battery can be restricted during battery preservation. Further, since the intermixture amount of the oxide is set such that the sum of the molar number of the at least one dissimilar element contained in one gram of the positive electrode active material to the molar number of lithium contained in one gram of the positive electrode active material is not more than five thousandths, the intermixture amount of the oxide is restricted to the amount of lithium which shoulders charge and discharge, and accordingly, an increase in internal resistance which becomes a hindrance at the time of using the battery can be restricted. In the first aspect, it is preferable that the intermixture amount of the oxide is set such that the sum of the molar number of the at least one dissimilar element contained in one gram of the positive electrode active material to the molar number of lithium contained in one gram of the positive electrode active material is not less than 0.1 thousandths. For the lithium transition metal complex oxide, for example, lithium cobaltate, lithium manganate, lithium manganese cobalt nickel complex oxide or lithium manganese nickel complex oxide can be used.

A second aspect of the present invention is directed to a non-aqueous electrolyte secondary battery comprising a positive electrode having a positive electrode active material including a lithium transition metal complex oxide and a conductive material; and a negative electrode, wherein the positive electrode active material is intermixed with an oxide of at least one dissimilar element, selected from elements of aluminum, silicon, titanium, vanadium, chromium, iron, nickel, copper, zinc, zirconium, molybdenum, tungsten and lead, and dissimilar to elements constituting the lithium transition metal complex oxide, is intermixed in the lithium transition metal complex oxide, and wherein an intermixture amount of the oxide is set such that a sum of a molar number of the at least one dissimilar element contained in one gram of the positive electrode active material to a molar number of lithium contained in one gram of the positive electrode active material is not more than five thousandths.

In the non-aqueous electrolyte secondary battery according to the second aspect, since the oxide of the at least one dissimilar element among the dissimilar elements is intermixed with the lithium transition metal complex oxide, and which has a characteristic of electric insulation or of electric resistance higher than that of a conductive material for a non-aqueous electrolyte secondary battery limits charge transfer during battery preservation, self-discharge of the battery can be restricted during battery preservation. Further, since the intermixture amount of the oxide is set such that the sum of the molar number of the at least one dissimilar element contained in one gram of the positive electrode active material to the molar number of lithium contained in one gram of the positive electrode active material is not more than five thousandths, the intermixture amount of the oxide is restricted to the amount of lithium which shoulders charge and discharge, and accordingly, an increase in internal resistance which becomes a hindrance at a time of using the battery can be restricted. In the second aspect, it is preferable that the intermixture amount of the oxide is set such that the sum of the molar number of the at least one dissimilar element contained in one gram of the positive electrode active material to the molar number of lithium contained in one gram of the positive electrode active material is not less than 0.1 thousandths. For the lithium transition metal complex oxide, for example, lithium cobaltate, lithium manganate, lithium manganese cobalt nickel complex oxide or lithium manganese nickel complex oxide can be used.

In order to achieve the above object, a third aspect of the present invention is directed to a method for manufacturing a positive electrode active material, including a lithium transition metal complex oxide, used for a non-aqueous electrolyte secondary battery, comprising the steps of: mixing (a) a lithium carbonate or a lithium hydroxide, (b) a transition metal oxide, a transition metal hydroxide or a transition metal carbonate, and (c) at least one dissimilar element, selected from elements of aluminum, silicon, titanium, vanadium, chromium, iron, nickel, copper, zinc, zirconium, molybdenum, tungsten and lead, and dissimilar to elements constituting elements of the lithium transition metal complex oxide; and sintering a mixture thereof under existence of oxygen. According to the manufacturing method of the third aspect, since the lithium transition metal complex oxide and the oxide of at least one dissimilar element among dissimilar elements are formed by sintering the mixed materials of (a), (b) and (c) under existence of oxygen, the lithium transition metal complex oxide, with which the oxide of the at least one dissimilar element among the dissimilar elements is intermixed, can be obtained.

Further, a fourth aspect of the present invention is directed to a method for manufacturing a positive electrode active material, including a lithium transition metal complex oxide, used for a non-aqueous electrolyte secondary battery, comprising the steps of: mixing (a) the lithium transition metal complex oxide, and (b) at least one dissimilar element, selected from elements of aluminum, silicon, titanium, vanadium, chromium, iron, nickel, copper, zinc, zirconium, molybdenum, tungsten and lead, and dissimilar to elements constituting the lithium transition metal complex oxide; and sintering a mixture thereof under existence of oxygen.

According to the present invention, as stated above, effects that, by using the positive electrode active material, which the oxide of the at least one dissimilar element among the dissimilar elements is intermixed with the lithium transition metal complex oxide for the non-aqueous electrolyte secondary battery, since charge transfer is limited by the oxide during battery preservation, self-discharge of the battery can be restricted during battery preservation; and since the intermixture amount of the oxide is set such that the sum of a molar number of the at least one dissimilar element contained in one gram of the positive electrode active material to the molar number of lithium contained in one gram of the positive electrode active material is not more than five thousandths, an increase in internal resistance which becomes a hindrance at the time of using the battery can be restricted, can be obtained.

DETAILED DESCRIPTION OF THE PREFERRED EMBODIMENTS

Figure 1:
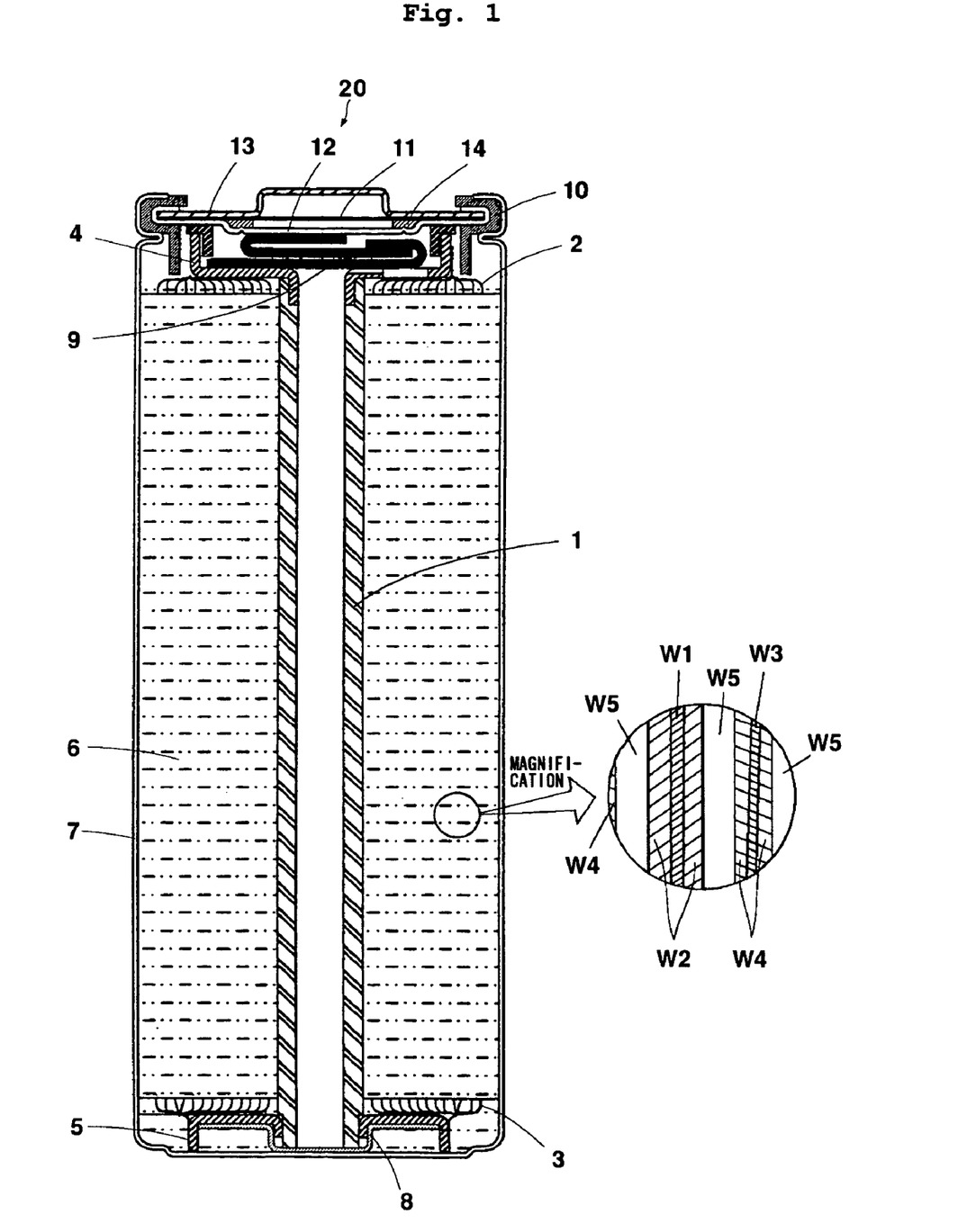
FIG. 1 is a sectional view of a cylindrical lithium-ion secondary battery of an embodiment to which the present invention is applicable.

With reference to the drawing, an embodiment in which the present invention is applied to a cylindrical lithium-ion secondary battery will be explained below.

(Structure)

As shown in FIG. 1, a cylindrical lithium-ion secondary battery 20 of this embodiment has a cylindrical battery container 7 made of nickel plated stainless steel and having a bottom, and an electrode group 6 which is formed by winding a strip shaped positive electrode and a strip shaped negative electrode spirally through separators W5 around a hallow cylindrical rod core 1 made of polypropylene.

An aluminum made positive electrode collecting ring 4 for collecting electric potential from the positive electrode is disposed at an upper side of the electrode group 6 approximately on an extension line of the rod core 1. The positive electrode collecting ring 4 is fixed to an upper end portion of the rod core 1. Each end portion of positive electrode lead pieces 2 led from the positive electrode is welded by ultrasonic welding to a peripheral face of a flange portion extended integrally from a periphery of the positive electrode collecting ring 4. A disc shaped battery lid which functions as a positive electrode external terminal is disposed at an upper side of the positive electrode collecting ring 4.

The battery lid comprises a lid case 12, a lid cap 13, a valve retainer 14 for keeping air-tightness, and a cleave valve 11 which cleaves according to an increase in internal pressure, and the battery container is assembled by stacking these members to caulk a peripheral edge of the lid case 12. One end of one positive electrode lead of two positive electrode leads 9, configured by stacking a plurality of ribbons made of aluminum, is fixed to an upper portion of the positive electrode collecting ring 4, and one end of another positive electrode lead is welded to the bottom face of the lid case 12. Another ends of the two positive electrode leads 9 are welded with each other.

On the other hand, a copper made negative electrode collecting ring 5 for collecting electric potential from the negative electrode is disposed at a lower side of the electrode group 6. An outer circumference of a lower end of the rod core 1 is fixed to an inner circumference of the negative electrode collecting ring 5. Each end portion of negative electrode lead pieces 3 led from the negative electrode is welded to an outer periphery of the negative electrode collecting ring 5. A copper made negative electrode lead plate 8, which is disposed at a lower side of the negative electrode collecting ring 5 and which is for electric conduction, is welded to an inner bottom portion of the battery container 7. In this embodiment, an outer diameter of the battery container 7 is set to 40 mm and an inner diameter thereof is set to 39 mm.

The battery lid is fixed by performing caulking via a gasket 10 made of EPDM having insulation and heat resisting properties at an upper portion of the battery container 7. For this reason, an interior of the lithium-ion secondary battery 20 is sealed. Unillustrated non-aqueous electrolytic solution is injected to the battery container 7. A lithium hexafluorophosphate ($LiPF_6$) as a lithium salt, dissolved at 1 mole/liter into mixed solvent of ethylene carbonate and dimethyl carbonate, both belonging to carbonate, at a volume ratio of 2:3, is used for the non-aqueous electrolytic solution. Incidentally, the lithium-ion secondary batter 20 is not provided with a current shutting-off mechanism, for example, such as a PTC (Positive Temperature Coefficient) element which functions electrically according to an increase in battery temperature or a mechanism for cutting off a positive or negative electric lead according to an increase in battery inner pressure.

The electrode group 6 is made in a manner that the positive electrode and the negative electrode are wound together via micro-porous separators W5 made of polyethylene each having a width of 90 mm and a thickness of 40 μm around the rod core 1 such that both the electrodes do not come in direct contact with each other. The positive electrode lead pieces 2 and negative electrode lead pieces 3 are respectively positioned at both end faces opposed to each other with respect to the winding group 6. Insulating covering or coating is applied on the electrode group 6 and the entire peripheral surface of the flange portion of the positive electrode collecting ring 4. An adhesive tape comprising a base member made of polyimide and adhesive agent made of hexameta-acrylate and applied to one surface thereof is used for the insulating covering. This adhesive tape is wound at least one time from the peripheral surface of the flange portion to the outer peripheral surface of the winding group 6. The lengths of the positive electrode, the negative electrode, and the separators W5 are adjusted to set the diameter of the winding group 6 to 38 ±0.1 mm.

The negative electrode constituting the electrode group 6 has a rolled copper foil W3 having a thickness of 10 μm as a negative collector. A negative electrode mixture W4 including a graphite powder served as a negative electrode active material in/from which lithium ions can be occluded/released (intercalated/deintercalated) is applied to both surfaces of the rolled copper foil W3 approximately uniformly and homogeneously. For example, 92 weight parts of a graphite powder is added with 8 weight parts of a polyvinylidene fluoride (hereinafter referred to as PVDF) as a binder to compound the negative electrode mixture W4. N-methyl-2-pyrrolidone (hereinafter referred to as NMP) as dispersion solvent is used for applying the negative electrode mixture W4 to the rolled copper foil 3. An applying amount of the graphite powder is set such that an amount of lithium ions released from the positive electrode and an amount of lithium ions occluded (intercalated) in the negative electrode at the time of initial charge after the battery is completed are 1:1.

A non-applied portion of the negative electrode mixture W4, with a width of 30 mm, is formed at one side edge, in a longitudinal direction, of the rolled copper foil W3. The non-applied portion is notched like a comb, and the negative electrode leads 3 are formed by notched remaining portions thereof. The distance or interval between the adjacent negative electrode lead pieces 3 is set to 50 mm and the width of each of negative electrode lead pieces 3 is set to 5 mm. The negative electrode, after drying, is pressed by a roll press machine which can heat the negative electrode such that the porosity of the negative electrode mixture W4 layer is set to about 35 volume %, and then cut to have a width of 86 mm.

On the other hand, the positive electrode has an aluminum foil W1 having a thickness of 20 μm as a positive collector. A positive electrode mixture W2 including a lithium transition metal complex oxide served as a positive electrode active material is applied to both surfaces of the aluminum foil W1 approximately uniformly and homogeneously. An oxide of at least one dissimilar element, an oxide of an alloy among dissimilar elements, or oxides of the at least one dissimilar element and an alloy among dissimilar elements (hereinafter referred to as oxidex) is/are intermixed with the lithium transition metal complex oxide. Here, a dissimilar element means one element selected from the elements of aluminum (Al), silicon (Si), titanium (Ti), vanadium (V), chromium (Cr), iron (Fe), nickel (Ni), copper (Co), zinc (Zn), zirconium (Zr), molybdenum (Mo), tungsten (W) and lead (Pb) and dissimilar to elements constituting the lithium transition metal complex oxide. Incidentally, the at least one dissimilar element, the alloy among the dissimilar elements, and the at least one dissimilar element and the alloy among the dissimilar elements are hereinafter referred to as "dissimilar element material" for convenience. For example, 8 weight parts of a graphite powder as a main conductive material, 2 weight parts of acetylene black as an assistant conductive material and 5 weight parts of the PVDF as a binder, to 85 weight parts of the positive electrode active material, are mixed in the positive electrode mixture W2. The NMP as dispersion solvent is used for applying the positive electrode mixture W2 to the aluminum foil W1.

A non-applied portion of the positive electrode mixture W2, with a width of 30 mm, is formed at one side edge, in a longitudinal direction, of the aluminum foil W1, in the same manner as the negative electrode, and the positive electrode leads 2 are formed. The distance or interval between the adjacent positive electrode lead pieces 2 is set to 50 mm and the width of each of positive electrode lead pieces 2 is set to 5 mm. The positive electrode, after drying, is pressed in the same manner as the negative electrode, such that the porosity of the positive electrode mixture W2 layer is set to about 30 volume %, and then cut to have a width of 82 mm.

(Positive Electrode Active Material)

The positive electrode active material prepared by one method among the following three methods is used:

Method A: A method of mixing a lithium transition metal complex oxide powder and an oxide X powder.

Method B: A method for mixing (a) lithium carbonate or lithium hydroxide for lithium sources, (b) transition metal oxide, transition metal hydroxide or transition metal carbonate, and (c) the dissimilar element material; and sintering a mixture thereof at a temperature of 900 deg. C. in the air (i.e., under existence of oxygen) for 48 hours. In this method, by sintering the mixture, the lithium transition metal complex oxide is formed, and the dissimilar element material is oxidized to form the oxide X.

Method C: A method for mixing (a) a lithium transition metal complex oxide powder and (b) the dissimilar element material; and sintering a mixture thereof at a temperature of 900 deg. C. in the air (i.e., under existence of oxygen) for 48 hours. In this method, the dissimilar element material is oxidized to form the oxide X without damaging (changing) the crystal structure of the lithium transition metal complex oxide.

In any one of the above methods, the lithium transition metal complex oxide with which the oxide X is intermixed can be obtained. The intermixture amount of the oxide X is adjusted (set) such that a sum of a molar number (a total molar number) of the dissimilar element(s) which constitute(s) the oxide X and which is/are contained in one gram of the positive electrode active material to a molar number of lithium contained in one gram of the positive electrode active material falls within a range of from 0.1 thousands (0.1/1000) to five thousands (5/1000).

One kind among lithium cobaltate ($LiCoO_2$), lithium manganate ($LiMn_2O_4$), lithium manganese cobalt nickel complex oxide ($LiMn_{0.4}Co_{0.2}Ni_{0.4}O_2$), and lithium manganese nickel complex oxide ($LiMn_{0.5}Ni_{0.5}O_2$) is used for the lithium transition metal complex oxide.

Each lithium transition metal complex oxide is prepared by the following manner: Lithium cobaltate ($LiCoO_2$) is obtained by mixing lithium carbonate and cobalt oxide ($Co_3O_4$) sufficiently such that an atom ratio of lithium and cobalt (Li/Co) is set to 1; and heating a mixture thereof at a temperature of 800 to 1000 deg. C. in the air. Lithium manganate ($LiMn_2O_4$) is obtained by mixing lithium carbonate and manganese oxide ($MnO_2$) sufficiently such that an atom ratio of lithium and manganese (Li/Mn) is set to 0.5; and heating a mixture thereof at a temperature of 800 to 1000 deg. C. in the air. Lithium manganese cobalt nickel complex oxide ($LiMn_{0.4}Co_{0.2}Ni_{0.4}O_2$) is obtained by mixing and dispersing lithium hydroxide (LiOH), manganese oxide ($Mn_3O_4$), cobalt hydroxide ($Co(OH)_2$) and nickel oxide ($NiO_2$) into aqueous solution of lithium hydroxide such that a mixed ratio of Li, Mn, Co and Ni is 1:0.4:0.2:0.4; and then after drying a mixture thereof, heating the mixture at a temperature of 800 to 1000 deg. C. in the air. Lithium manganese nickel complex oxide ($LiMn_{0.5}Ni_{0.5}O_2$) is obtained by mixing and dispersing lithium hydroxide, manganese oxide ($Mn_3O_4$) and nickel oxide into aqueous solution of lithium hydroxide such that a mixed ratio of Li, Mn and Ni is 1:0.5:0.5; and then after drying a mixture thereof, heating the mixture at a temperature of 800 to 1000 deg. C. in the air.

In Method A, at least one oxide, selected from oxides obtained by heating the powder of (1) aluminum oxide ($Al_2O_3$), (2) silicon oxide (oxide silicon) ($SiO_2$), (3) titanium oxide ($TiO_2$), (4) vanadium oxide ($VO_2$), (5) chromic oxide ($Cr_2O_3$), (6) iron oxide ($Fe_2O_3$), (7) nickel oxide (NiO), (8) copper oxide (CuO), (9) zinc oxide (ZnO), (10) zirconium oxide ($ZrO_2$), (11) molybdenum oxide ($MoO_2$), (12) tungsten oxide ($WO_3$), (13) plumbicoxide (leadoxide) ($PbO_2$), and (14) stainless steel (austenitic stainless steel including an alloy of iron—chromium (18%)-nickel (8%)) at a temperature of 900 deg. C. in the air for 48 hours, is used for the oxide X. A particle diameter of each oxide X is adjusted to approximately 10 to 100 μm by screening or the like.

In Methods B and C, at least one element, selected from elements among aluminum, silicon, titanium, vanadium, chromium, iron, nickel, copper, zinc, zirconium, molybdenum, tungsten, lead and stainless steel (austenitic stainless steel including an alloy of iron-chromium (18%)-nickel (8%)) which is an alloy of the dissimilar elements and of which particle diameter is adjusted to approximately 10 to 70 μm, is used for the dissimilar element material.

The positive electrode active material thus prepared was confirmed to be the lithium transition metal complex oxide by the measurement results of the X-ray diffraction method. The oxide X in the positive electrode active material was confirmed by using selective dissolution conditions that only the lithium transition metal complex oxide was selectively dissolved but the oxide X was not dissolved into acid solution. The selective dissolution conditions were set by paying an attention to dissolution speed difference in the acid solution between the lithium transition metal complex oxide and the oxide X. The composition of residual substance in undissolution was analyzed by an energy dispersive X-ray analyzer, when the positive electrode active material was dispersed and dissolved into mixed acid solution of hydrochloric acid or sulfuric acid and hydrogen peroxide solution, to confirm that the residual substance is the oxide X.

EXAMPLES

Next, batteries of Examples of the lithium-ion secondary battery 20 manufactured according to the present embodiment will be explained below. Incidentally, batteries of Controls (Comparative Examples) manufactured for making a comparison with the batteries of Examples will also be explained.

Example 1

As shown in the following Table 1, in Example 1, lithium cobaltate ($LiCoO_2$) was used for the lithium transition metal complex oxide. One kind among the oxides of 14 kinds ((1) to (14)) was used for the oxide X. The positive electrode active material was prepared by the lithium cobaltate and the oxide X according to Method A. The intermixture amount of the oxide X was set to 5/1000. Incidentally, a commercial product having a grade of chemical reagent was used for the oxide X. Further, in Table 1, lithium cobaltate in parentheses among lithium transition metal complex oxides shows that it was formed by sintering the mixture of lithium carbonate, cobalt oxide and the oxide X.

TABLE 1

|  | Lithium Transition Metal Complex Oxide | Intermixture Amount | Method |
|---|---|---|---|
| Example 1 | $LiCoO_2$ | 5/1000 | A |
| Example 2 | $LiCoO_2$ | 1/1000 | A |
| Example 3 | $LiCoO_2$ | 0.1/1000 | A |
| Example 4 | $(LiCoO_2)$ | 5/1000 | B |
| Example 5 | $(LiCoO_2)$ | 1/1000 | B |
| Example 6 | $LiCoO_2$ | 1/1000 | C |
| Example 7 | $LiMn_2O_4$ | 1/1000 | C |
| Example 8 | $LiMn_{0.4}Co_{0.2}Ni_{0.4}O_2$ | 1/1000 | C |
| Example 9 | $LiMn_{0.5}Ni_{0.5}O_2$ | 1/1000 | C |
| Control 1 | $LiCoO_2$ | 0 | A |
| Control 4 | $(LiCoO_2)$ | 0 | B |
| Control 6 | $LiCoO_2$ | 0 | C |
| Control 7 | $LiMn_2O_4$ | 0 | C |
| Control 8 | $LiMn_{0.4}Co_{0.2}Ni_{0.4}O_2$ | 0 | C |
| Control 9 | $LiMn_{0.5}Ni_{0.5}O_2$ | 0 | C |

Examples 2 and 3

As shown in Table 1, in Example 2 and Example 3, batteries were manufactured in the same manner as Example 1 except the intermixture amount of the oxide X. The intermixture amount was set to 1/1000 in Example 2, and it was set to 0.1/1000 in Example 3.

Example 4

As shown in Table 1, in Example 4, the positive electrode active material was prepared by Method B. After mixing lithium carbonate and cobalt oxide ($CO_3O_4$) sufficiently such that the atom ratio of lithium and cobalt (Li/Co) was set to 1, one kind of the following dissimilar elements and the alloy of the dissimilar elements was mixed sufficiently so that the intermixture amount was set to 5/1000, then the mixture was sintered. (1) Aluminum, (2) silicon, (3) titanium, (4) vanadium, (5) chromium, (6) iron, (7) nickel, (8) copper, (9) zinc, (10) zirconium, (11) molybdenum, (12) tungsten, (13) lead and (14) austenitic stainless steel (the alloy of iron—chromium (18%)-nickel (8%)) were used for the dissimilar elements and the alloy of the dissimilar elements. The positive electrode thus obtained was confirmed as lithium cobaltate ($LiCoO_2$) according to the results of X-ray diffraction.

Example 5

As shown in Table 1, in Example 5, a battery was manufactured in the same manner as Example 4, except that the intermixture amount of the dissimilar element or the alloy of the dissimilar elements was set to 1/1000.

Example 6

As shown in Table 1, in Example 6, the positive electrode active material was prepared by lithium cobaltate ($LiCoO_2$) as a lithium transition metal complex oxide and one kind among the dissimilar elements and the alloy of the dissimilar elements of the 14 kinds which were used in Example 4, according to Method C. The intermixture amount of the dissimilar element or the alloy of the dissimilar elements was set to 1/1000. The positive electrode active material thus obtained was confirmed that the crystal structure of $LiCoO_2$ was unchanged according to the results of X-ray diffraction.

Examples 7 to 9

As shown in Table 1, in Example 7 to Example 9, batteries were manufactured in the same manner as Example 6 except that the lithium transition metal complex oxide was changed. Lithium manganate ($LiMn_2O_4$) was used in Example 7, lithium manganese cobalt nickel complex oxide ($LiMn_{0.4}Co_{0.2}Ni_{0.4}O_2$) was used in Example 8, and lithium manganese nickel complex oxide ($LiMn_{0.5}Ni_{0.5}O_2$) was used in Example 9, as the lithium transition metal complex oxide respectively.

<Controls>

As shown in Table 1, in Control 1, a battery was manufactured in the same manner as Example 1, except that no oxide X was added, i.e., the intermixture amount was 0. In Control 4, a battery was manufactured in the same manner as Example 4, except that neither the dissimilar element nor the alloy of the dissimilar elements was added, i.e., the intermixture amount was 0. In Controls 6 to 9, batteries were manufactured in the same manners as Examples 6 to 9, respectively, except that neither the dissimilar element nor the alloy of the dissimilar elements was added, i.e., the intermixture amount was 0.

(Preservation Test)

After each of the batteries of Examples and Controls were charged on the following charge conditions, the batteries were preserved at 60 deg. C. for 30 days. The battery voltages before and after the preservation were measured respectively, and each voltage difference ΔmV thereof was calculated. The charge conditions: each of the batteries were charged continuously with 2A constant current, and then, when the voltage of each of the batteries reached 4.0V, each of the batteries were switched to 4.0V constant voltage charge. When the charge current reached 10 mA, the battery charge was stopped. The environmental temperature at the time of charging each of the batteries was set to 25 deg. C. Further, each of the batteries were preserved under the environments of 25 deg. C. for 24 hours or more before starting the battery charge. The calculation results of the voltage difference ΔmV are shown in the following Table 2 to Table 10 for each of Examples.

TABLE 2

|  | Lithium Transition Metal Complex Oxide | Oxide | Intermixture Amount | ΔmV |
|---|---|---|---|---|
| Example 1-(1) | $LiCoO_2$ | $Al_2O_3$ | 5/1000 | 93 |
| Example 1-(2) |  | $SiO_2$ |  | 92 |
| Example 1-(3) |  | $TiO_2$ |  | 92 |
| Example 1-(4) |  | $VO_2$ |  | 93 |
| Example 1-(5) |  | $Cr_2O_3$ |  | 92 |
| Example 1-(6) |  | $Fe_2O_3$ |  | 91 |
| Example 1-(7) |  | NiO |  | 92 |
| Example 1-(8) |  | CuO |  | 91 |
| Example 1-(9) |  | ZnO |  | 92 |
| Example 1-(10) |  | $ZrO_2$ |  | 93 |
| Example 1-(11) |  | $MoO_2$ |  | 92 |
| Example 1-(12) |  | $WO_3$ |  | 92 |
| Example 1-(13) |  | $PbO_2$ |  | 91 |
| Example 1-(14) |  | Oxide of iron-chromium(18%)-nickel(8%) |  | 93 |
| Control 1 |  | — | 0 | 102 |

As shown in Table 2, in each battery of Example 1 that one kind among the oxides X of the 14 kinds was intermixed with the lithium cobaltate power at the intermixture amount of 5/1000, the voltage difference ΔmV was held lower comparing with the battery of Control 1 that no oxide X was intermixed. This shows that intermixing the oxide X makes voltage reduction lower at the time of battery preservation, in short, makes self discharge small.

TABLE 3

| | Lithium Transition Metal Complex Oxide | Oxide | Intermixture Amount | ΔmV |
|---|---|---|---|---|
| Example 2-(1) | $LiCoO_2$ | $Al_2O_3$ | 1/1000 | 97 |
| Example 2-(2) | | $SiO_2$ | | 95 |
| Example 2-(3) | | $TiO_2$ | | 94 |
| Example 2-(4) | | $VO_2$ | | 96 |
| Example 2-(5) | | $Cr_2O_3$ | | 95 |
| Example 2-(6) | | $Fe_2O_3$ | | 93 |
| Example 2-(7) | | NiO | | 96 |
| Example 2-(8) | | CuO | | 95 |
| Example 2-(9) | | ZnO | | 94 |
| Example 2-(10) | | $ZrO_2$ | | 96 |
| Example 2-(11) | | $MoO_2$ | | 95 |
| Example 2-(12) | | $WO_3$ | | 96 |
| Example 2-(13) | | $PbO_2$ | | 93 |
| Example 2-(14) | | Oxide of iron-chromium(18%)-nickel(8%) | | 96 |

As shown in Table 3, in each battery of Example 2 that one kind among the oxides X of the 14 kinds was intermixed with the lithium cobaltate power at the intermixture amount of 1/1000, the voltage difference ΔmV was held lower comparing with the battery of Control 1 (See Table 2.) that no oxide X was intermixed.

TABLE 4

| | Lithium Transition Metal Complex Oxide | Oxide | Intermixture Amount | ΔmV |
|---|---|---|---|---|
| Example 3-(1) | $LiCoO_2$ | $Al_2O_3$ | 0.1/1000 | 97 |
| Example 3-(2) | | $SiO_2$ | | 97 |
| Example 3-(3) | | $TiO_2$ | | 94 |
| Example 3-(4) | | $VO_2$ | | 96 |
| Example 3-(5) | | $Cr_2O_3$ | | 97 |
| Example 3-(6) | | $Fe_2O_3$ | | 94 |
| Example 3-(7) | | NiO | | 96 |
| Example 3-(8) | | CuO | | 96 |
| Example 3-(9) | | ZnO | | 95 |
| Example 3-(10) | | $ZrO_2$ | | 97 |
| Example 3-(11) | | $MoO_2$ | | 95 |
| Example 3-(12) | | $WO_3$ | | 97 |
| Example 3-(13) | | $PbO_2$ | | 94 |
| Example 3-(14) | | Oxide of iron-chromium(18%)-nickel(8%) | | 97 |

As shown in Table 4, in each battery of Example 3 which the positive electrode active material that one kind among the oxides X of the 14 kinds was intermixed with the lithium cobaltate power at the intermixture amount of 1/1000 was used, the voltage difference ΔmV was also held lower comparing with the battery of Control 1 (See Table 2.) that no oxide X was intermixed. When comparing the results of each battery of Example 1 to Example 3 (See Table 2 to Table 4.), each battery of Example 1 that the intermixture amount was set to 5/1000 as shown in Table 2 exhibited a smaller voltage difference ΔmV than each battery of Example 2 that the intermixture amount was set to 1/1000 and each battery of Example 3 that the intermixture amount was set to 0.1/1000. This shows that increasing the intermixture amount of the oxide X makes effects of lowering voltage reduction larger, in short, makes self discharge smaller.

TABLE 5

| | Lithium Transition Metal Complex Oxide | Oxide | Intermixture Amount | ΔmV |
|---|---|---|---|---|
| Example 4-(1) | $LiCoO_2$ | $Al_2O_3$ | 5/1000 | 92 |
| Example 4-(2) | | $SiO_2$ | | 92 |
| Example 4-(3) | | $TiO_2$ | | 92 |
| Example 4-(4) | | $VO_2$ | | 93 |
| Example 4-(5) | | $Cr_2O_3$ | | 92 |
| Example 4-(6) | | $Fe_2O_3$ | | 92 |
| Example 4-(7) | | NiO | | 92 |
| Example 4-(8) | | CuO | | 91 |
| Example 4-(9) | | ZnO | | 92 |
| Example 4-(10) | | $ZrO_2$ | | 93 |
| Example 4-(11) | | $MoO_2$ | | 91 |
| Example 4-(12) | | $WO_3$ | | 93 |
| Example 4-(13) | | $PbO_2$ | | 91 |
| Example 4-(14) | | Oxide of iron-chromium(18%)-nickel(8%) | | 93 |
| Control 4 | | — | 0 | 102 |

As shown in Table 5, in each battery of Example 4 which the positive electrode active material obtained by mixing lithium carbonate and cobalt oxide (material of lithium carbonate), and one kind, among the dissimilar elements and the alloy of the dissimilar elements, of which intermixture amount was 5/1000, and then sintering the mixture, was used, the voltage difference ΔmV was held lower comparing with the battery of Control 4 (the same battery as Control 1) that the positive electrode active material (i.e., lithium cobaltate), obtained by mixing no dissimilar element nor alloy of the dissimilar elements, and then sintering the material of lithium cobaltate, was used. This shows that the positive electrode active material that lithium cobaltate and the oxide X were formed by heating the material of lithium cobaltate and one kind among the dissimilar elements and the alloy of the dissimilar elements in the air makes self discharge small.

TABLE 6

| | Lithium Transition Metal Complex Oxide | Oxide | Intermixture Amount | ΔmV |
|---|---|---|---|---|
| Example 5-(1) | $LiCoO_2$ | $Al_2O_3$ | 1/1000 | 96 |
| Example 5-(2) | | $SiO_2$ | | 96 |
| Example 5-(3) | | $TiO_2$ | | 94 |
| Example 5-(4) | | $VO_2$ | | 96 |
| Example 5-(5) | | $Cr_2O_3$ | | 94 |
| Example 5-(6) | | $Fe_2O_3$ | | 93 |
| Example 5-(7) | | NiO | | 96 |
| Example 5-(8) | | CuO | | 95 |
| Example 5-(9) | | ZnO | | 94 |
| Example 5-(10) | | $ZrO_2$ | | 96 |
| Example 5-(11) | | $MoO_2$ | | 96 |
| Example 5-(12) | | $WO_3$ | | 95 |
| Example 5-(13) | | $PbO_2$ | | 93 |
| Example 5-(14) | | Oxide of iron-chromium(18%)-nickel(8%) | | 95 |

As shown in Table 6, in each battery of Example 5 which the positive electrode active material obtained by mixing lithium carbonate, cobalt oxide and one kind, among the dissimilar elements and the alloy of the dissimilar elements, of which intermixture amount was 1/1000, and then sintering the mixture, was used, the voltage difference ΔmV was held lower comparing with the battery of Control 4. (See Table 5.) Further, the voltage difference ΔmV shows a little larger comparing with that of each battery of Example 4. This shows that increasing the intermixture amount of the at least one kind among the dissimilar elements and the alloy of the dissimilar elements makes voltage reduction lower at the time of battery preservation.

TABLE 7

| | Lithium Transition Metal Complex Oxide | Oxide | Intermixture Amount | ΔmV |
|---|---|---|---|---|
| Example 6-(1) | LiCoO$_2$ | Al$_2$O$_3$ | 1/1000 | 96 |
| Example 6-(2) | | SiO$_2$ | | 95 |
| Example 6-(3) | | TiO$_2$ | | 94 |
| Example 6-(4) | | VO$_2$ | | 96 |
| Example 6-(5) | | Cr$_2$O$_3$ | | 94 |
| Example 6-(6) | | Fe$_2$O$_3$ | | 94 |
| Example 6-(7) | | NiO | | 96 |
| Example 6-(8) | | CuO | | 95 |
| Example 6-(9) | | ZnO | | 94 |
| Example 6-(10) | | ZrO$_2$ | | 96 |
| Example 6-(11) | | MoO$_2$ | | 96 |
| Example 6-(12) | | WO$_3$ | | 95 |
| Example 6-(13) | | PbO$_2$ | | 94 |
| Example 6-(14) | | Oxide of iron-chromium(18%)-nickel(8%) | | 95 |
| Control 6 | | — | 0 | 102 |

As shown in Table 7, in each battery of Example 6 which the positive electrode active material obtained by mixing the lithium cobaltate powder and the one kind, among the dissimilar elements and the alloy of the dissimilar elements, of which intermixture amount was 1/1000, and then sintering the mixture, was used, the voltage difference ΔmV was held lower, comparing with the battery of Control 6 which the positive electrode active material (i.e., lithium cobaltate) obtained by sintering the lithium cobaltate power without mixing the one kind among the dissimilar elements and the alloy of the dissimilar elements was used. This shows that the positive electrode active material in which the oxide X was formed without changing the crystal structure of lithium cobaltate by heating lithium cobaltate together with the one kind among the dissimilar elements and the alloy of the dissimilar elements in the air makes voltage reduction low.

TABLE 8

| | Lithium Transition Metal Complex Oxide | Oxide | Intermixture Amount | ΔmV |
|---|---|---|---|---|
| Example 7-(1) | LiMn$_2$O$_4$ | Al$_2$O$_3$ | 1/1000 | 93 |
| Example 7-(2) | | SiO$_2$ | | 94 |
| Example 7-(3) | | TiO$_2$ | | 92 |
| Example 7-(4) | | VO$_2$ | | 93 |
| Example 7-(5) | | Cr$_2$O$_3$ | | 93 |
| Example 7-(6) | | Fe$_2$O$_3$ | | 92 |
| Example 7-(7) | | NiO | | 94 |
| Example 7-(8) | | CuO | | 92 |
| Example 7-(9) | | ZnO | | 92 |
| Example 7-(10) | | ZrO$_2$ | | 93 |
| Example 7-(11) | | MoO$_2$ | | 93 |
| Example 7-(12) | | WO$_3$ | | 93 |
| Example 7-(13) | | PbO$_2$ | | 94 |
| Example 7-(14) | | Oxide of iron-chromium(18%)-nickel(8%) | | 92 |
| Control 7 | | — | 0 | 97 |

As shown in Table 8, in each battery of Example 7 which the positive electrode active material obtained by mixing the lithium manganate (LiMn$_2$O$_4$) powder and the one kind, among the dissimilar elements and the alloy of the dissimilar elements, of which intermixture amount was 1/1000, and then sintering the mixture, was used, the voltage difference ΔmV was held lower, comparing with the battery of Control 7 which the positive electrode active material (i.e., lithium manganate) obtained by sintering the lithium manganate power without mixing the one kind among the dissimilar elements and the alloy of the dissimilar elements was used. This shows that the positive electrode active material in which the oxide X was formed without changing the crystal structure of lithium manganate by heating lithium manganate together with the one kind among the dissimilar elements and the alloy of the dissimilar elements in the air makes voltage reduction low.

TABLE 9

| | Lithium Transition Metal Complex Oxide | Oxide | Intermixture Amount | ΔmV |
|---|---|---|---|---|
| Example 8-(1) | LiMn$_{0.4}$Co$_{0.2}$Ni$_{0.4}$O$_2$ | Al$_2$O$_3$ | 1/1000 | 92 |
| Example 8-(2) | | SiO$_2$ | | 92 |
| Example 8-(3) | | TiO$_2$ | | 93 |
| Example 8-(4) | | VO$_2$ | | 91 |
| Example 8-(5) | | Cr$_2$O$_3$ | | 92 |
| Example 8-(6) | | Fe$_2$O$_3$ | | 92 |
| Example 8-(7) | | NiO | | 91 |
| Example 8-(8) | | CuO | | 91 |
| Example 8-(9) | | ZnO | | 93 |
| Example 8-(10) | | ZrO$_2$ | | 91 |
| Example 8-(11) | | MoO$_2$ | | 92 |
| Example 8-(12) | | WO$_3$ | | 92 |
| Example 8-(13) | | PbO$_2$ | | 93 |
| Example 8-(14) | | Oxide of iron-chromium(18%)-nickel(8%) | | 91 |
| Control 8 | | — | 0 | 95 |

As shown in Table 9, in each battery of Example 8 which the positive electrode active material obtained by mixing the lithium manganese cobalt nickel complex oxide (LiMn$_{0.4}$Co$_{0.2}$Ni$_{0.4}$O$_2$) powder and the one kind, among the dissimilar elements and the alloy of the dissimilar elements, of which intermixture amount was 1/1000, and then sintering the mixture, was used, the voltage difference ΔmV was held lower comparing with the battery of Control 8 which the positive electrode active material (i.e., lithium manganese cobalt nickel complex oxide) obtained by sintering the lithium manganese cobalt nickel complex oxide power without mixing the one kind among the dissimilar elements and the alloy of the dissimilar elements was used. This shows that the positive electrode active material in which the oxide X was formed without changing the crystal structure of lithium manganese cobalt nickel complex oxide by heating lithium manganese cobalt nickel complex oxide together with the one kind among the dissimilar elements and the alloy of the dissimilar elements in the air makes self discharge small.

TABLE 10

| | Lithium Transition Metal Complex Oxide | Oxide | Intermixture Amount | ΔmV |
|---|---|---|---|---|
| Example 9-(1) | $LiMn_{0.5}Ni_{0.5}O_2$ | $Al_2O_3$ | 1/1000 | 93 |
| Example 9-(2) | | $SiO_2$ | | 91 |
| Example 9-(3) | | $TiO_2$ | | 92 |
| Example 9-(4) | | $VO_2$ | | 91 |
| Example 9-(5) | | $Cr_2O_3$ | | 91 |
| Example 9-(6) | | $Fe_2O_3$ | | 93 |
| Example 9-(7) | | NiO | | 91 |
| Example 9-(8) | | CuO | | 92 |
| Example 9-(9) | | ZnO | | 93 |
| Example 9-(10) | | $ZrO_2$ | | 91 |
| Example 9-(11) | | $MoO_2$ | | 92 |
| Example 9-(12) | | $WO_3$ | | 92 |
| Example 9-(13) | | $PbO_2$ | | 92 |
| Example 9-(14) | | Oxide of iron-chromium(18%)-nickel(8%) | | 92 |
| Control 9 | | — | 0 | 95 |

As shown in Table 10, in each battery of Example 9 which the positive electrode active material obtained by mixing the lithium manganese nickel complex oxide ($LiMn_{0.5}Ni_{0.5}O_2$) powder and the one kind, among the dissimilar elements and the alloy of the dissimilar elements, of which intermixture amount was 1/1000, and then sintering the mixture, was used, the voltage difference ΔmV was held lower comparing with the battery of Control 9 which the positive electrode active material (i.e., lithium manganese nickel complex oxide) obtained by sintering the lithium manganese nickel complex oxide power without mixing the one kind among the dissimilar elements and the alloy of the dissimilar elements was used. This shows that the positive electrode active material in which the oxide X was formed without changing the crystal structure of lithium manganese nickel complex oxide by heating lithium manganese nickel complex oxide together with the one kind among the dissimilar elements and the alloy of the dissimilar elements in the air makes self discharge small.

(Effects and the Like)

Next, effects and the like of the lithium-ion secondary battery 20 according to the present embodiment will be explained.

In the lithium-ion secondary battery 20 of this embodiment, the positive electrode active material that the oxide of the dissimilar element, namely, the oxide of one kind element among aluminum, silicon, titanium, vanadium, chromium, iron, nickel, copper, zinc, zirconium, molybdenum, tungsten and lead, and the one kind element being dissimilar to the elements that constitute the lithium transition metal complex oxide, or the oxide of the alloy of the dissimilar elements is intermixed with the lithium transition metal complex oxide is used. The oxide X has a property of electric insulation, or, even if it has such a property, it has electric resistance higher than that of the graphite or the acetylene black used for a conductive material. Accordingly, since charge transfer is limited by the oxide X intermixed with the lithium transition metal complex oxide at the time of the preservation of the lithium-ion secondary battery 20, self-discharge and voltage (performance) reduction can be restricted during battery preservation.

Further, in the lithium-ion secondary battery 20 of this embodiment, the intermixture amount of the oxide X is set such that the sum of the molar number of the dissimilar element contained in one gram of the positive electrode active material to the molar number of lithium contained in one gram of the positive electrode active material is not more than 5/1000. Since the intermixture amount of the oxide is limited to the amount of lithium which shoulders charge and discharge, an increase in internal resistance which becomes a hindrance usually at the time of using the battery due to electric resistance of the intermixed oxide X can be restricted. Furthermore, the voltage reduction at the time of battery preservation can be suppressed according to the intermixture amount of the oxide X. (See Example 1 to Example 3.) Besides, since the intermixture amount is set to not less than 0.1/1000, the charge transfer at the time of battery preservation is restricted reliably so that self discharge can be restricted. Above all, in the lithium-ion secondary battery 20 of this embodiment, a preservation characteristic is excellent (self discharge is small) even after it is preserved at a relatively high temperature for long hours.

Furthermore, in the present embodiment, the positive electrode active material used for the lithium-ion secondary battery 20 is prepared by any one of the method of mixing the lithium transition metal complex oxide power and the oxide X powder (Method A), the method of mixing lithium carbonate or lithium hydroxide for lithium sources, transition metal oxide, transition metal hydroxide or transition metal carbonate, and the one kind among the dissimilar elements and the alloy of the dissimilar elements, and then sintering the mixture (Method B), and the method of mixing the lithium transition metal complex oxide powder and the one kind among the dissimilar elements and the alloy of the dissimilar elements, and then sintering the mixture (Method C).

In Method A, the one kind oxide X is intermixed with the lithium transition metal complex oxide. Since charge transfer is repressed by the oxide X during battery preservation, the voltage reduction of the battery can be restricted. (Example 1 to Example 3) Further, in Method B, since each material is oxidized by sintering, the lithium transition metal complex oxide together with the oxide X of the dissimilar element or the oxide of the alloy of the dissimilar elements are formed. Thus, the positive electrode active material in which the one kind oxide X is intermixed with the lithium transition metal complex oxide can be obtained. Since charge transfer is repressed by the oxide X during battery preservation, the voltage reduction of the battery can be restricted. (Example 4 and Example 5) Furthermore, in Method C, the dissimilar element or the alloy of the dissimilar elements is oxidized by sintering to form the oxide X without damaging (changing) the crystal structure of the lithium transition metal complex oxide. Thus, the positive electrode active material in which the one kind oxide X is intermixed with the lithium transition metal complex oxide can be obtained. Since charge transfer is repressed by the oxide X during battery preservation, the voltage reduction of the battery can be restricted. (Example 6 to Example 9)

By contrast, in the conventional lithium-ion secondary battery, in a case that a foreign metal is intermixed with the lithium transition metal complex oxide, the intermixed foreign metal dissolves into electrolytic solution and deposits on the surface of the positive electrode and/or the negative electrode. Since the deposited foreign metal grows and breaks through a separator interposed between the positive and negative electrodes, minute short-circuits between the electrodes occur, and the voltage reduction and the performance reduction during battery preservation are brought forth. Even if the amount of foreign metals in the lithium transition metal complex oxide is set to be limited, it is difficult to get rid of foreign metals since they get mixed from a conductive material, a binder, a collector and the like. For this reason, in the conventional lithium-ion secondary battery, battery performance such as voltage, capacity and the like is lowered at the time of battery preservation due to self-discharge and ascending of internal resistance. The lithium-ion secondary battery 20 according to the present embodiment overcomes those problems.

Incidentally, in the above embodiment, lithium cobaltate, lithium manganate, lithium manganese cobalt nickel complex oxide and lithium manganese nickel complex oxide were shown as the lithium transition metal complex oxide, however, the present invention is not limited to the same. For example, lithium transition metal complex oxides having different compositions may be used. Further, the crystal structure of the lithium transition metal complex oxide is not limited. For example, the lithium transition metal complex oxide may have a spinel crystal structure or a layer crystal structure.

Further, in the above Examples, the example that one kind of the oxide X was intermixed with the lithium transition metal complex oxide was shown, however, the present invention is not restricted to this. At least one kind among the dissimilar elements and the alloy of the dissimilar elements can be used for the oxide X. In a case that a plurality of the oxides X are intermixed, the intermixture amount of the oxides X can be set such that the sum of the molar number of the oxides X contained in one gram of the positive electrode active material to the molar number of lithium contained in one gram of the positive electrode active material is in a range of from 0.1/1000 to 5/1000. Furthermore, the stainless steel (alloy of iron—chromium (18%)-nickel (8%)) was exemplified as the alloy of the dissimilar elements, however, the present invention is not confined to this. The alloy of two kinds or more among the dissimilar elements may be used. It should be noted that the term "alloy" means not only the alloy among the metallic elements but also the chemical compound of silicon (nonmetallic element) listed as the dissimilar element and the metallic element(s).

Furthermore, in the above embodiment, the graphite powder as a main conductive material and the acetylene black as an assistant conductive material for the positive electrode were shown, however, the present invention is not limited to the same. Conductive materials normally used for non-aqueous electrolyte secondary batteries may be used for the conductive materials. Incidentally, the blending quantity of the conductive materials is not limited specifically.

Further, in the above embodiment, the non-aqueous electrolytic solution that the lithium hexafluorophosphate ($LiPF_6$) as a lithium salt is dissolved at 1 mole/liter into mixed solution of ethylene carbonate and dimethyl carbonate at the volume ratio of 2:3 was exemplified, however, the present invention is not limited to this. Non-aqueous electrolytic solution normally used for non-aqueous electrolyte secondary batteries may be used for the non-aqueous electrolytic solution. As electrolytic solution other than the above embodiment, for example, diethyl carbonate, methyl-ethyl carbonate, propylene carbonate and the like, and mixed solvent of two kinds among these may be listed, and a mixed ratio thereof is not limited. As a lithium salt other than the above embodiment, $LiClO_4$, $LiAsF_6$, $LiBF_4$, $LiB(C_6H_5)_4$, $CH_3SO_3Li$, $CF_3SO_3Li$ and the like, and a mixture thereof may be used.

Furthermore, in the above embodiment, the graphite power was shown as a negative electrode active material, however, the present invention is not confined to the same. For example, amorphous carbon and the like may be used. A conductive material such as a carbon material and the like may be mixed to the negative electrode active material.

Further, in the above embodiment, the electrode group 6 that the positive and negative electrodes are wound was shown, however, the present invention is not limited to this. For example, an electrode group that positive and negative electrodes cut in a rectangular shape are laminated or stacked via separators may be used. Furthermore, in the above embodiment, the cylindrical lithium-ion secondary battery 20 was shown, however, the present invention is not restricted to this. For example, the present invention is also applicable to a rectangular lithium-ion secondary battery. Besides, in the above embodiment, the concrete numeric values of the positive and negative electrodes, electrode group 6, battery container 7, separator W5 and the like were shown, however, the present invention is not limited to these.

INDUSTRIAL APPLICABILITY

Because the present invention provides the positive electrode active material which can restrict lowering of battery performance during battery preservation, the non-aqueous secondary battery using the positive electrode active material and the method for manufacturing the positive electrode active material, the present invention contributes to manufacturing and marketing of the non-aqueous secondary battery. Accordingly, the present invention has industrial applicability.

What is claimed is:

1. A positive electrode comprising an active material, wherein substantially all of the active material of said electrode includes a lithium transition metal complex oxide, used for a non-aqueous electrolyte secondary battery, wherein an oxide of at least one dissimilar element, selected from elements of aluminum, silicon, titanium, vanadium, chromium, iron, nickel, copper, zinc, zirconium, molybdenum, tungsten and lead, and dissimilar to elements constituting the lithium transition metal complex oxide, is intermixed with all of the lithium transition metal complex oxide, and wherein an intermixture amount of the oxide is set such that a sum of a molar number of the at least one dissimilar element contained in one gram of the positive electrode active material to a molar number of lithium contained in one gram of the positive electrode active material is between one and five thousandths.

2. A positive electrode active material according to claim 1, wherein the positive electrode active material comprises the lithium transition metal complex oxide with which the at least one dissimilar element is intermixed, a conductive material and a binder, and wherein electric resistance of the at least one dissimilar element is larger than that of the conductive material.

3. A positive electrode active material according to claim 1, wherein the lithium transition metal complex oxide is any one of lithium cobaltate, lithium manganate, lithium manganese cobalt nickel complex oxide and lithium manganese nickel complex oxide.

4. A non-aqueous electrolyte secondary battery comprising a positive electrode having a positive electrode active material including a lithium transition metal complex oxide and a conductive material; and a negative electrode, wherein the positive electrode active material is intermixed with an oxide of at least one dissimilar element, selected from elements of aluminum, silicon, titanium, vanadium, chromium, iron, nickel, copper, zinc, zirconium, molybdenum, tungsten and lead, and dissimilar to elements constituting the lithium transition metal complex oxide, is intermixed in all of the lithium transition metal complex oxide, and wherein an intermixture amount of the oxide is set such that a sum of a molar number of the at least one dissimilar element contained in one gram of the positive electrode active material to a molar number of lithium contained in one gram of the positive electrode active material is between one and five thousandths.

5. A non-aqueous electrolyte secondary battery according to claim 4, wherein the positive electrode active material comprises the lithium transition metal complex oxide with which the at least one dissimilar element is intermixed, a conductive material and a binder, and wherein electric resistance of the at least one dissimilar element is larger than that of the conductive material.

6. A non-aqueous electrolyte secondary battery according to claim 4, wherein the lithium transition metal complex oxide is any one of lithium cobaltate, lithium manganate, lithium manganese cobalt nickel complex oxide and lithium manganese nickel complex oxide.

* * * * *